No. 695,218. Patented Mar. 11, 1902.
L. J. LINDSAY.
MARKER FOR CORN PLANTERS.
(Application filed Nov. 4, 1901.)
(No Model.)
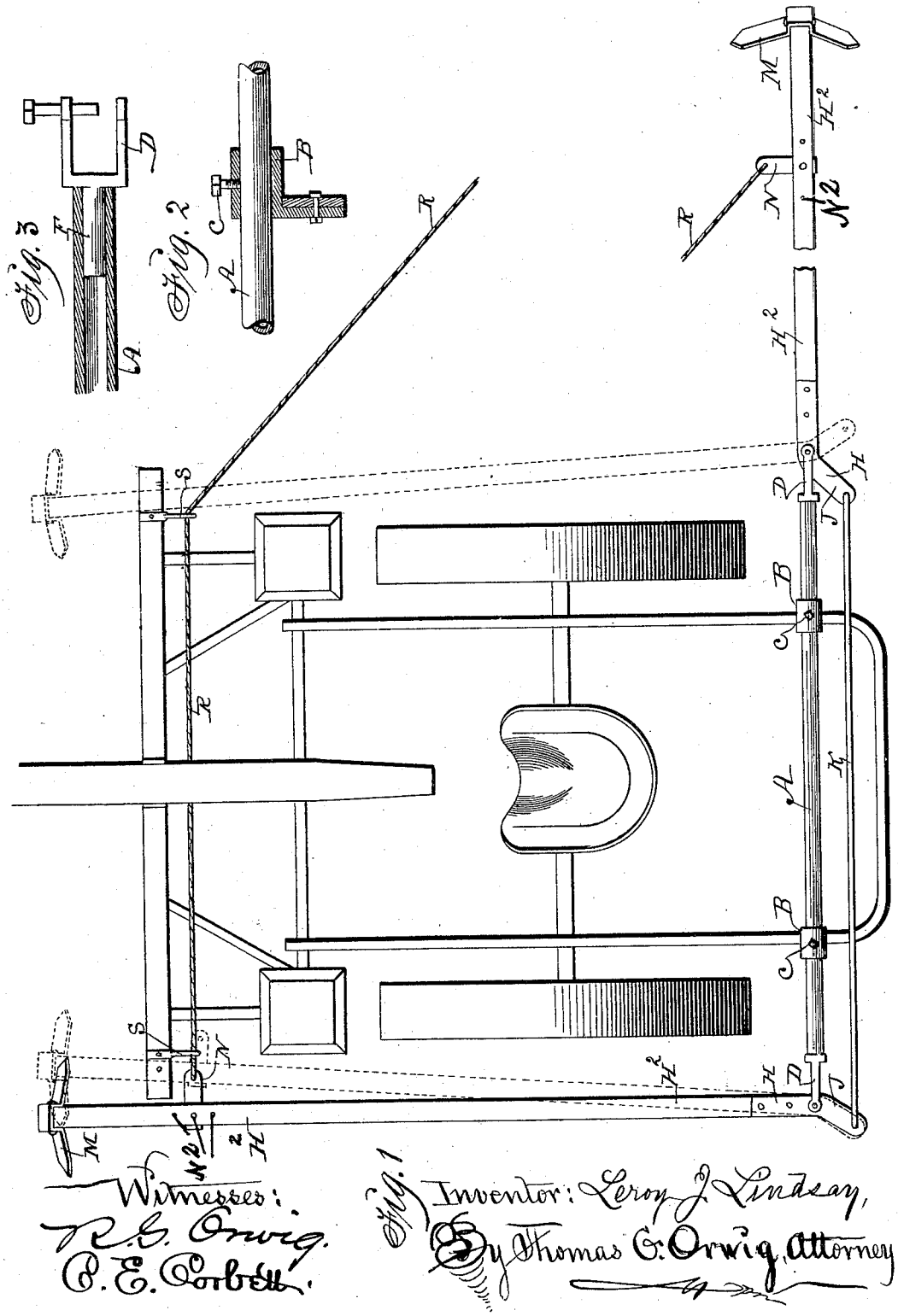

UNITED STATES PATENT OFFICE.

LEROY J. LINDSAY, OF SEYMOUR, IOWA.

MARKER FOR CORN-PLANTERS.

SPECIFICATION forming part of Letters Patent No. 695,218, dated March 11, 1902.

Application filed November 4, 1901. Serial No. 81,060. (No model.)

*To all whom it may concern:*

Be it known that I, LEROY J. LINDSAY, a citizen of the United States, residing at Seymour, in the county of Wayne and State of Iowa, have invented a new and useful Marker for Corn-Planters, of which the following is a specification.

Heretofore an automatic marker has been adjustably connected with the carriage of a corn-planter in such a manner that a person could reverse the marker at the end of a row, as required, to be in proper position on the opposite side of the planter after the machine was turned about to make a return trip across a field.

My object is to provide automatic markers that will facilitate adjusting them at the end of a row when the carriage is turned about to make a return trip.

My invention consists in the construction and application of parts, as hereinafter set forth, pointed out in my claims, and illustrated in the accompanying drawings, in which—

Figure 1 is a top view of a planter, showing my invention applied thereto as required for practical use. Fig. 2 is a detail view showing the manner of detachably connecting a straight bar to the rear end of the carriage-frame for pivotally connecting marker-carriers therewith. Fig. 3 is a detail view showing how the marker-carrier is adjustably and detachably connected with the straight bar that extends across the rear end of the carriage-frame.

The letter A designates a straight bar or tube fixed to the rear end of the carriage-frame, preferably detachably, by means of bearers B, fixed to the carriage-frame, through which the bar or tube is extended and then fastened by means of set-screws c.

Clevises D, having journal extensions F on their ends, are fitted in bores in the ends of the bar or tube A to pivotally and detachably connect them therewith.

Elbow-shaped levers H, made of metal, are pivoted in the clevises D and their short arms J connected by means of a rod K, that has hooks at its ends to enter perforations in said short arms in such a manner that the rod will prevent longitudinal movement of the extensions F, as required, to retain the clevises D in their places in the ends of the bar or tube A and also in such a manner that the rod can be readily detached from the levers.

Wooden extensions H² are fixed to the long arms of the metal elbow-shaped levers H for supporting and carrying markers M at their extremities. The markers are adapted in shape to penetrate the surface of the ground and to make continuous tracks or furrows that will serve as conspicuous marks for guiding the direction and maintaining the proper distance of the planter from the rows previously planted, as required, for planting parallel straight rows equidistant apart and to produce check-rows.

Perforated metal rope-fasteners N are adjustably connected with the free end portions of the extensions H² of the levers H by means of a plurality of perforations in the extensions and bolts N², as shown, or in any suitable way, so the two extensions H², that carry the markers M, can be readily connected by means of a rope R, fixed at its ends, to the fasteners N.

Eyes s or other suitable forms of rope-supports are fixed to the front portion of the runner-frame of the carriage in such a manner that the rope R will be retained in proper position thereby and also allowed to slide back and forth therein.

In the practical operation of my invention thus constructed and applied one of the extensions H² is placed at right angles to the line of advance to carry the marker M at a proper distance from the carriage, and the other extension H² is placed in parallel position with line of advance and close to the carriage and its front end elevated, so that it will carry the marker M thereon inoperative. The pivoted journals F of the clevises D allow the front ends of the marker-carriers H² to be elevated to carry the markers M inoperative alternately while the planter is in operation and also to carry both inoperative when moving from one field to another. It is obvious when one of the markers is thus advanced and operated and the other carried elevated and inoperative that in turning the planter around at the end of a field the marker that is down and in contact with the ground will by friction with the ground practically serve as a pivot while the carriage is turned toward it and the length of the rope R shortened between it and the carriage, while at the same time the marker on the other side of the carriage will be lowered to engage the ground and by friction with the ground be retained in position as a pivot while the carriage turns away from it and causes the carrier H² to assume a right-angled position relative to the carriage and the line of advance on a return trip.

To carry both markers inoperative, the rod K is disconnected from one of the short arms of the elbow-shaped lever H, so the extension H² can be placed in position, as indicated by dotted line in Fig. 1, to be supported on the front of the runner-frame of the carriage.

When a shaft for carrying scrapers for cleaning the carriage-wheels is fixed to the carriage, it is obvious my marker mechanism may be combined with said shaft.

Having thus described the construction, application, and operation of my invention, the practical utility thereof will be readily understood and appreciated by persons familiar with the art to which it pertains, and

What I claim as new, and desire to secure by Letter Patent, is—

1. In a marker for corn-planters, a bar fixed to the rear end of a carriage-frame to extend across from one side to the other in rear of the carriage-wheels, elbow-shaped levers pivotally connected with the ends of said bar and a rod pivotally connected with the short and rear arms of the levers, arranged and combined to operate in the manner set forth for the purposes stated.

2. In a marker for corn-planters, a bar fixed to the rear end of a carriage-frame to extend across from one side to the other in rear of the carriage-wheels, elbow-shaped levers pivotally connected with the ends of said bar and a rod pivotally connected with the levers, extensions of the long arms of the elbow-shaped levers, markers fixed to the free ends of said extensions, a rope fixed to the same ends of said extensions and means for supporting and directing the sliding motion of the rope, arranged and combined to operate in the manner set forth for the purposes stated.

3. In a marker for corn-planters, a bar having bores in its ends to admit journals fixed to the rear of a carriage, a clevis having a journal at its end pivotally connected with said fixed bar and an elbow-shaped lever pivoted in the clevis, arranged and combined to operate in the manner set forth for the purposes stated.

4. In a marker for corn-planters, a bar fixed across the rear end of a carriage, elbow-shaped levers pivotally connected with the ends of said fixed bar, a rod pivotally connected with the short arms of said levers, markers fixed to the front ends of the long arms of said levers and rope-fasteners connected with the end portions of the same long arms, arranged and combined to operate in the manner set forth for the purposes stated.

5. A marker for corn-planters comprising a bar fixed to the rear end of a carriage, elbow-shaped levers pivotally connected with the ends of said fixed bar, a rod pivotally connected with the rear and short arms of the levers forward extensions of the long arms of the levers, markers fixed to the free ends of said extensions, a rope fixed to the end portions of said extensions and rope supporting and guiding devices fixed to the front portion of the carriage, arranged and combined to operate in the manner set forth for the purposes stated.

LEROY J. LINDSAY.

Witnesses:
E. J. COLE,
S. E. WYCOFF.